F. M. WILSON.
CHEESE COVER FOR CUTTERS.
APPLICATION FILED NOV. 18, 1912.
1,175,212.
Patented Mar. 14, 1916.
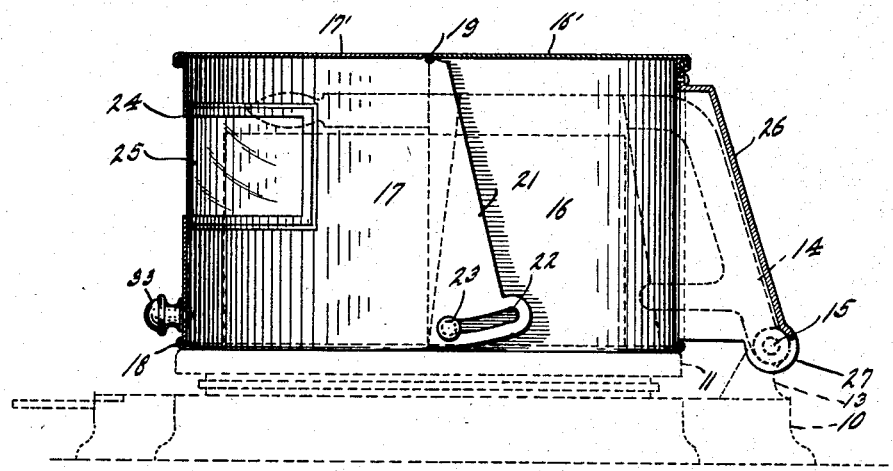
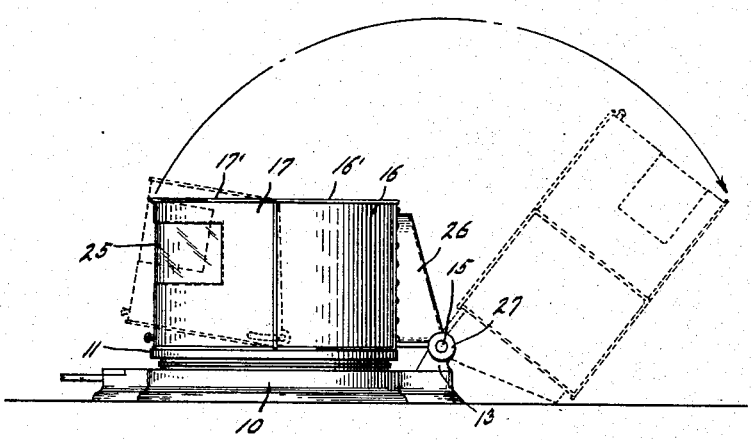
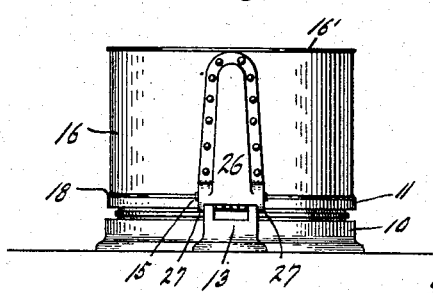
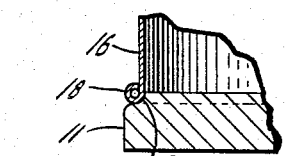
Witnesses
Frank A. Fahle
May Layden
Inventor
Forrest M. Wilson,
By Arthur M. Hood
Attorney

UNITED STATES PATENT OFFICE.

FORREST M. WILSON, OF ANDERSON, INDIANA, ASSIGNOR TO COMPUTING CHEESE CUTTER COMPANY, OF ANDERSON, INDIANA, A CORPORATION OF INDIANA.

CHEESE-COVER FOR CUTTERS.

1,175,212.  Specification of Letters Patent.  Patented Mar. 14, 1916.

Application filed November 18, 1912. Serial No. 732,098.

*To all whom it may concern:*

Be it known that I, FORREST M. WILSON, a citizen of the United States, residing at Anderson, in the county of Madison and State of Indiana, have invented a new and useful Cheese-Cover for Cutters, of which the following is a specification.

There are at the present time a very considerable number of cheese cutters comprising a horizontally rotatable cheese carrying table and a vertically reciprocable knife generally arranged radially, in a vertical plane, relative to the table. It is undesirable to allow the cheese to remain uncovered while on this table and it is the object of my present invention to provide a cover of minimum size.

It is a further object of my invention to so form the upper corner of the cheese-carrying table and the lower edge of the cover, and to so arrange the pivotal support for the cover that a substantially tight fit may be attained between the cover and the table without difficulty.

The accompanying drawings illustrate my invention.

Figure 1 is a vertical section of my improved cover, upon and around a cheese cutter and cheese indicated by dotted lines; Fig. 2 is a side elevation on a smaller scale of the complete apparatus; Fig. 3 a rear elevation; and Fig. 4 a fragmentary sectional detail.

In the drawings, 10 indicates the base of the cheese cutter and 11 indicates the horizontally rotatable cheese carrying table, the upper corner of which I prefer to chamfer as indicated at 12 in Fig. 4. The base 10 is provided with a pivotal support 13 for the knife carrying arm 14 and I prefer to arrange the axis of the pivot 15 substantially in the plane of the chamfer 12, it being understood, of course, that the knife rests upon the table when the apparatus is not in use.

My improved cover comprises two substantially semicylindrical mating sections 16 and 17 which are closed at their upper ends by the top plates 16' and 17' respectively. The two members 16 and 17 when in closed position form a substantially cylindrical inverted pan, the lower edge 18 of which is conveniently rolled and fitted in the chamfer 12. The two sections 16 and 17 are hinged together at the adjacent edges of the cover members 16' and 17', as indicated at 19 and the side walls of one of the members are extended to overlap the adjacent portions of the side walls of the other member. In the present drawings the side wall of section 17 is extended as indicated at 21 each extension being provided with a segmental slot 22 receiving a pin 23 carried by the side wall of the adjacent section 16 and permitting a preliminary swing of section 17 relative to section 16 as indicated in dotted lines at the left of Fig. 2. Secured to the lower front portion of section 17 is a handle 33 and I also prefer to provide the side wall of section 17 with a sight opening 24 of considerable extent, said sight opening being closed, for sanitary reasons, by a transparent sheet 25.

The vertical wall of member 16 is slotted at its rear to accommodate the frame of the cutter 14 and this opening is covered by a cap 26 which is extended rearwardly and downward and provided with perforated ears 27 mounted upon pivot 15, the arrangement being such that the cover may be swung independently of but concentric with the cutter 14.

When the cover is in closed position it will closely cover the cheese upon table 11 and fit snugly in the chamfer 12 so as to properly preserve the cheese against drying. When it is desired to dispense a portion of the cheese from the main body, the operator will grasp handle 33 so as to lift section 17 upon hinge 19 to the limit of the swing permitted by slot 22, whereupon the whole cover may be swung backwardly to the position indicated by the dotted lines at the right of Fig. 2. This preliminary movement of the section 17 is for the purpose of insuring against any contact between the cover and the upper forward corner of the cheese upon table 11, especially when said cheese has a thickness of the maximum capacity of the cutter.

I claim as my invention:

1. The combination with a cheese cutter having a horizontally rotatable table, and a vertically swinging knife, of an inverted pan-like cover pivotally supported adjacent the cheese carrying table upon the knife pivot, said cover comprising two mating sections hinged together near the top upon an axis substantially parallel with the pivotal axis of the cover.

2. The combination with a cheese cutter having a horizontally rotatable table, a support therefor, and a vertically swinging knife mounted on said support to coöperate with the table, of an inverted pan-like cover covering said table and knife, said cover comprising two mating sections one hinged upon the table-support and the two hinged together near the top upon an axis substantially parallel with the pivotal axis of the cover.

3. The combination with a cheese cutter having a horizontally rotatable table, and a vertically swinging knife, of an inverted pan-like cover pivotally supported adjacent the cheese carrying table upon the knife pivot, said cover comprising two mating sections hinged together near the top upon an axis substantially parallel with the pivotal axis of the cover, and the lower edge of the cover and the upper corner of the cheese carrying table formed to telescope when the cover is in covering position.

4. The combination with a cheese cutter having a horizontally rotatable table, a support therefor, and a vertically swinging knife mounted on said support to coöperate with the table, of an inverted pan-like cover covering said table and knife, said cover comprising two mating sections one hinged upon the table-support and the two hinged together near the top upon an axis substantially parallel with the pivotal axis of the cover and the lower edge of the cover and the upper corner of the cheese carrying table formed to telescope when the cover is in covering position.

5. The combination with a cheese cutter having a horizontally rotatable table and a vertically swinging knife, of an inverted pan-like cover pivotally supported adjacent the rotatable table upon the knife pivot said table forming a support for the open lower end of the pan-like cover.

6. The combination with a cheese cutter having a horizontally rotatable table, a support therefor, and a vertically swinging knife coöperating with said table, of an inverted pan-like cover covering said table and knife and pivotally supported upon the support adjacent the rotatable table, said cover being movable independently of the knife and when lifted rendering the knife accessible, and said table forming a support for the open lower end of the pan-like cover.

7. The combination with a cheese cutter having a horizontally movable cheese carrying table, a support therefor, and an associated cheese cutting knife, of an inverted pan-like cover movably supported upon the support adjacent the movable table so as to cover the table and knife, said cover being movable independently of the knife and when lifted rendering the knife accessible, and said table forming a support for the open lower end of the pan-like cover.

8. The combination with a cheese cutter having a horizontally movable table and a vertically swinging knife, of a cover member inclosing said table, said cover member comprising a portion pivotally supported upon the knife pivot.

9. In a device for vending a commodity in portions, a commodity-supporting table, a coöperating swinging cutter and its support, and a cover for the table and cutter, said cover being pivotally mounted upon the cutter-support to swing in the same plane as said cutter but independently thereof.

10. In a device for vending a commodity in portions, a commodity-supporting table, a coöperating swinging cutter and its support, and a cover for the table, said cover being pivotally mounted upon the cutter-support to swing in the same plane as said cutter but independently thereof.

11. A cheese cutter including a main frame, a turn-table mounted on the frame, a knife frame pivotally connected to the main frame and a handle arm thereon, a knife secured to the knife frame and the handle arm to rest upon the turn-table, a cover for the turn-table and the knife frame and handle arm and also the knife provided with a supporting arm and means for hingedly connecting the arm of the cover with the main frame, so that the cover is movable separately from the knife frame.

12. In a cheese cutter, the combination with a main frame provided with a pivot, a turn-table rotatably mounted on the main frame, a cutting knife frame connected to said pivot, and a knife secured to said knife frame to rest when inactive upon said turn-table, of a cover connected to said pivot and removably covering said turn-table and also said knife frame and knife when at rest.

13. In a cheese cutter, the combination with a main frame provided with a pivot, a table on the main frame, and a knife frame connected to the pivot and when at rest extending above the table, of a cover for the table having an arm connected to the pivot and extending over the top and down opposite the two vertical sides of the pivoted portion of the knife frame.

14. In a cheese cutter, the combination of a main frame, a table mounted on the frame, a knife frame and a cover operatively connected together and also with the main frame to move together or separately away from or toward the table, the cover extending over the knife frame, and a cutting knife secured to the knife frame.

15. In a cheese cutter, the combination of a main frame, a table mounted on the frame, a knife frame and a cover therefor operatively connected together and also with the main frame to move away from or toward the table, the cover being supported to move either with or relatively to the knife frame, and a cutting knife secured to the knife frame.

16. In a cheese cutter, the combination of a main frame, a table mounted on the frame, a knife frame pivotally connected with the main frame, a cover for the table and the knife frame having a hollow arm operatively connected with the knife frame and extending over a portion of the knife frame, and a knife secured to the knife frame.

17. In a device for vending a commodity in portions, a commodity-supporting table, a coöperating swinging cutter and its support, a cover for the table and cutter, said cover being pivotally mounted upon the cutter-support to swing independently of the cutter and in its movements to cover and uncover the entire table and cutter.

18. In a device for vending a commodity in portions, a commodity-supporting table, a coöperating swinging cutter and its support, and a cover for the table, said cover being pivotally mounted upon the cutter-support to swing independently of the cutter and in its movements to cover and uncover the entire table.

In witness whereof, I have hereunto set my hand and seal at Indianapolis, Indiana, this 26th day of September, A. D. one thousand nine hundred and twelve.

FORREST M. WILSON. [L. S.]

Witnesses:
ARTHUR M. HOOD,
FRANK A. FAHLE.

Copies of this patent may be obtained for five cents each, by addressing the "Commissioner of Patents, Washington, D. C."